United States Patent
Kirla et al.

(10) Patent No.: US 7,343,282 B2
(45) Date of Patent: Mar. 11, 2008

(54) METHOD FOR TRANSCODING AUDIO SIGNALS, TRANSCODER, NETWORK ELEMENT, WIRELESS COMMUNICATIONS NETWORK AND COMMUNICATIONS SYSTEM

(75) Inventors: Olli Kirla, Espoo (FI); Henrik Lepanaho, Helsinki (FI); Teemu Himanen, Helsinki (FI)

(73) Assignee: Nokia Corporation, Espoo (FI)

( * ) Notice: Subject to any disclaimer, the term of this patent is extended or adjusted under 35 U.S.C. 154(b) by 733 days.

(21) Appl. No.: 10/481,784

(22) PCT Filed: Jun. 26, 2001

(86) PCT No.: PCT/EP01/07290

§ 371 (c)(1),
(2), (4) Date: Jan. 14, 2004

(87) PCT Pub. No.: WO03/003770

PCT Pub. Date: Jan. 9, 2003

(65) Prior Publication Data

US 2004/0254786 A1  Dec. 16, 2004

(51) Int. Cl.
G10L 19/00 (2006.01)
G10L 21/00 (2006.01)
H04B 1/38 (2006.01)
H04M 7/00 (2006.01)

(52) U.S. Cl. .................. 704/212; 375/222; 379/229
(58) Field of Classification Search .................. 704/212
See application file for complete search history.

(56) References Cited

U.S. PATENT DOCUMENTS 5,022,046 A * 6/1991 Morrow, Jr. ................ 375/130
5,473,631 A * 12/1995 Moses ........................ 375/130
5,581,652 A   12/1996 Abe et al.
5,878,037 A *  3/1999 Sherman .................... 370/335
6,035,177 A *  3/2000 Moses et al. ................ 725/22
6,072,784 A *  6/2000 Agrawal et al. ............ 370/311
6,182,031 B1   1/2001 Kidder et al.
6,353,666 B1 *  3/2002 Henderson et al. ......... 379/229
2002/0131377 A1 *  9/2002 DeJaco et al. ............. 370/329

(Continued)

FOREIGN PATENT DOCUMENTS

| CN | 1254221 | 5/2000 |
| WO | WO 99/60738 A | 11/1999 |
| WO | WO 99/63775 A | 12/1999 |
| WO | WO 01/48931 A | 7/2001 |

*Primary Examiner*—David Hudspeth
*Assistant Examiner*—Justin W. Rider
(74) *Attorney, Agent, or Firm*—Squire, Sanders & Dempsey LLP

(57) ABSTRACT

The invention relates to a method for transcoding audio signals in a communications system. In order to improve the inter-operability between units (2,40) capable of handling wideband audio signals and units (3,46) or network components (50) capable of handling narrowband audio signals, it is proposed that first, an audio signal is received in a network element (42) of a communications network via which said audio signal is transmitted. Next, it is determined in said network element (42) whether a transcoding of the received audio signal is required. In case a narrowband-to-wideband transcoding of the received signal is required, the received narrowband audio signal is transcoded into a wideband audio signal in the network element (1,42). The generated wideband audio signal is then forwarded to the receiving terminal (2,40). The invention equally relates to a corresponding communications system and its components.

34 Claims, 6 Drawing Sheets

U.S. PATENT DOCUMENTS

2003/0012221 A1* 1/2003 El-Maleh et al. ........... 370/466

2003/0219009 A1* 11/2003 Unger ........................ 370/352

* cited by examiner

METHOD FOR TRANSCODING AUDIO SIGNALS, TRANSCODER, NETWORK ELEMENT, WIRELESS COMMUNICATIONS NETWORK AND COMMUNICATIONS SYSTEM

FIELD OF THE INVENTION

The invention relates to a method for transcoding an audio signal in a communications system, which audio signal is to be transmitted to a receiving unit via a communications network. The invention equally relates to a transcoder, to a network element comprising a transcoder and to a wireless communications network and a communications system comprising a network element with a transcoder.

BACKGROUND OF THE INVENTION

In conventional telecommunications systems, the bandwidth employed for transmitting speech signals has typically been limited to a frequency range of about 300 to 3400 Hz with a sampling rate of 8 kHz. This limitation applies to normal PCM (pulse code modulation) speech, which employs a 64 kbit/s coding defined in specification ITU-T G.711, as well as to most of the low-bit rate speech coding methods used in telecommunications systems.

The use of such a narrow frequency rage for speech transmissions reduces naturalness and intelligibility of the speech when presented at the receiving end. Therefore, wideband speech was introduced, which provides a better speech quality to the user of the receiving terminal. Wideband speech codecs (compressor/decompressor) were standardized e.g. in ITU-T G.722, which specifications extend the bandwidth to up to 8 kHz with a sampling frequency of 16 kHz. Current wideband speech transmissions, however, requires bit-transparent end-to-end connections, e.g. by ISDN (Integrated Services Digital Network). Only tandem-free operation (TFO) or transcoder-free operation (TrFO) connections between two wideband terminals allow to fully utilize the wideband terminal capabilities. In addition, it requires special terminals equipped at both transmission ends with the same wideband codecs. These restrictions have limited to date the utilization of wideband speech.

In the future, the importance of wideband speech will increase, as the forthcoming adaptive multirate wideband (AMR-WB) speech codec, standardized in various 3 GPP specifications, will be taken into use for the 2G (second generation) and 3G (third generation) networks. But also AMR-WB will require bit-transparent tandem free operation and AMR-WB capable terminals.

To date, the majority of terminals moreover still uses narrowband speech transmissions, and each connection between a wideband terminal on the one hand and a narrowband terminal on the other hand is narrowband. In order to establish e.g. a call between an AMR-WB capable and a conventional narrowband (NB) terminal, like a PSTN (Public Switched Telephone Network) or a PLMN (Public Land Mobile Network) terminal, either the coding method needs to be negotiated in a way that the AMR-WB terminal shall use a narrow band codec, or AMR-WB speech frames need to be transcoded into narrowband speech and vice versa in the network. In both cases the user of a receiving AMR-WB terminal will experience narrowband speech. Thus there will be an annoying quality difference between AMR-WB to AMR-WB and narrowband to AMR-WB calls. This further reduces the benefits gained with wideband terminals, until such terminals become widely available.

The same problems are encountered also with narrowband services accessed by a user of a wideband terminal, e.g. announcements, voice mail systems, interactive voice interfaces and narrowband audio streaming applications. In case speech-based network services are to be provided for both, wideband and narrowband terminals, the storage capacity required for storing speech samples for both terminal types is moreover tripled compared to the conventional narrowband case.

Another problem with the transmission of wideband audio signals results from the fact that the extended audio bandwidth used by the wideband terminals requires more transmission capacity. More specifically, the transmission capacity requirements are doubled for equal speech coding schemes. In addition, the adoption of wideband speech transmission in wireless communications network is difficult due to the lack of established wideband codecs for telecommunication networks.

SUMMARY OF THE INVENTION

It is an object of the invention to improve the interoperability between units capable of handling wideband audio signals and units or network components capable of handling narrowband audio signals.

It is moreover an object of the invention to achieve a better audio quality when narrowband audio signals are transmitted to a receiving unit capable of handling wideband audio signals.

On the one hand, a method for transcoding an audio signal in a communications system is proposed, for which method the audio signal is supposed to be transmitted to a receiving unit via a communications network. The proposed method comprises as first step receiving an audio signal in a network element of the communications network. In a second step of the method, it is determined in the network element whether a transcoding of the received audio signal is required. The decision is based on the kind of the received signal and on the capabilities of the receiving unit and/or the capabilities of an interconnect network interconnecting the network element with the receiving unit. Then, a received narrowband audio signal is converted into a wideband audio signal in the network element, in case the received audio signal is a narrowband audio signal and in case it was determined that a narrowband-to-wideband transcoding of the received signal is required. Finally, the generated wideband audio signal is forwarded to the receiving unit.

On the other hand, a transcoder for a network element of a communications network is proposed which comprises means for converting a received narrowband audio signal into a wideband audio signal. Whether a transcoding is actually performed depends on an indication from within said network element that a narrowband-to-wideband transcoding of a received signal is required. The indication might even be generated within the transcoder itself.

Moreover, a network element for a communications network is proposed, which comprises in addition to the proposed transcoder processing means for determining whether a transcoding of a received audio signal is required based on the kind of the received audio signal and on the capabilities of the receiving terminal and/or the capabilities of an interconnect network interconnecting the network element with a receiving unit. Further, the network element comprises means for forwarding audio signals to a receiving unit. Equally proposed is a wireless communications network with such a network element.

Finally, a communications system is proposed which comprises a communications network with the proposed network element, and in addition at least one unit capable of handling narrowband audio signals and at least one further unit capable of handling wideband audio signals. The two units can be interconnect via said communications network. The device capable of transmitting narrowband audio signals can be in particular either a server presenting services to a receiving terminal or another terminal, e.g. a mobile terminal. An alternatively proposed communications network comprises at least two units capable of handling wideband audio signals, which can be interconnected via a wireless communications network comprising the proposed network element.

The invention proceeds from the idea that a transcoding of a narrowband audio signal into a wideband audio signal can be implemented advantageously in a network element of a communications system. By integrating all the load caused by a transcoding and also the decision whether a transcoding is needed in a network element of a communications system, the interoperability of units capable of handling wideband audio signals and units or network components capable of handling narrowband audio signals can be improved.

It is an advantage of the invention that an extra signaling for the transcoding during a call setup or forwarding can be avoided. Terminals and other units can moreover be more simple as they do not need to know and transcode many different codecs. Thus, any terminal or other unit can be employed in the communication according to the invention without requiring extra functionalities. Further, terminals usually also have only a restricted capacity available, and it is easier to provide the processing capacity needed in the network.

Preferred embodiments of the invention become apparent from the subclaims.

Preferably, the transcoding comprises generating an at least partially artificial wideband audio signal based on the received narrowband audio signal. This way, the frequency range missing in narrowband audio signals can be supplemented artificially when converting a narrowband audio signal into a wideband audio signal. The wideband audio signal provided to the receiving unit is thus at least partially artificial, but since it is proposed to be generated based on the received narrowband signal, it can be close to the original audio signal. Therefore, the invention allows to provide high quality audio signals, in particular high quality speech, for a wideband terminal user.

Since a received narrowband audio signal is usually transmitted in coded form, the coded signal is advantageously first decoded to a linear narrowband audio signal before it is converted. After conversion to a linear wideband audio signal, the signal can then be encoded again before it is forwarded to the receiving unit.

The generation of at least partially artificial wideband signals out of received narrowband signal can be carried out in different ways. It can be based in particular on a statistical evaluation of the received narrowband signals, e.g. by using dedicated codebooks for narrowband and wideband signals and by mapping narrowband codebook values to wideband codebook values for creating a spectrum shaping filter. Alternatively, other statistical mapping methods can be employed. The artificial wideband signal can also based on an up-sampling narrowband audio signals and a subsequent frequency shaping, or on spectral foldings of narrowband audio signals.

Preferably, the transcoder of the invention comprises in addition to the means for converting a received narrowband audio signal into a wideband audio signal-means for converting a received wideband audio signal into a narrowband audio signal. The latter means can then be employed in case it was determined that a wideband-to-narrowband transcoding is necessary, whenever an audio signal is to be transmitted from a wideband unit to a narrowband unit. This ensures that the transcoder can be employed bi-directionally, which further improves the interoperability between different units. Accordingly, a negotiation of a common narrowband codec in involved units during call setup or call forwarding is not needed. It also enables calls in cases in which a common narrowband codec cannot be found. The method of the invention can be extended accordingly to cover a transcoding in both directions.

The receiving unit employed according to the invention can therefore be in particular a wideband terminal, a narrowband terminal or a speech-based network service equipment.

Advantageously, also a received wideband audio signal is first decoded to a linear wideband audio signal before it is converted to a linear narrowband audio signal. The linear narrowband audio signal is then encoded before it is forwarded to the receiving narrowband unit. The conversion can comprise a lowpass filtering of the linear wideband audio signal and a down-sampling of the lowpass filtered wideband audio signal, in order to achieve an alias distortion free narrowband audio signal.

Alternatively, the coded wideband speech could be converted directly to a coded narrowband audio signal in the speech parameter domain, i.e. without decoding and encoding in the transcoder. However, this requires that the narrowband and the wideband codec are of the same technology family, e.g. an AMR-narrowband codec and an AMR-wideband codec. By employing a parameter domain conversion, some of the parameters within the codec need to be converted, e.g. spectrum and excitation parameters. Other parameters need no or only minor adjustments, e.g. pitch and gain parameters. This approach can be used equally for narrowband to wideband conversions and for wideband to narrowband conversions. A narrowband to wideband conversion in the parameter domain can but does not have to include an artificial bandwidth expansion.

The invention is particularly suited for four different situations.

In a first situation, a PSTN (public switched telephone network) narrowband terminal is connected via a communications network with a wideband terminal. The wideband terminal can be in particular a mobile wideband terminal, in which case the communications network is formed by an interconnect network and in addition a wireless communications network to which the wideband terminal is connected. If a narrowband audio signal addressed to the wideband terminal is transmitted by the PSTN terminal via the communications network, the narrowband audio signal is converted to an at least partially artificial wideband audio signal in a network element of the communications network. In case the wideband terminal is a mobile terminal, the network element is preferably a network element of the wireless communications network to which the wideband terminal is connected.

Also in the three other situations, the transcoding will be carried out advantageously in a network element of a wireless communications network, e.g. a GSM (Global System for Mobile Communications) or a UMTS (Universal Mobile Telecommunications System) network.

In the second situation, audio signals are to be transmitted from a narrowband terminal to a wideband terminal. By providing an artificial bandwidth expansion in a network element of the communications network via which signals are transmitted from the narrowband terminal to the wideband terminal, the user of the wideband terminal can immediately utilize the wideband capabilities of the terminal. Thus, the inter-operability between wideband and narrowband terminals is improved. For the case that the narrowband terminal is to be employed as receiving unit, the network element should further include means for converting wideband audio signals into narrowband audio signals. The transcoding in either direction is preferably carried out close to the wideband terminal in order to avoid the necessity of transmitting wideband signal on the entire transmission path.

In the third situation, audio signals are to be transmitted between a wideband terminal as receiving unit and a speech-based network service equipment. If an artificial bandwidth expansion is provided in a network element of the communications network employed for transmitting the audio signals to the wideband terminal as receiving unit, only narrowband speech samples need to be stored in the network service equipment. Also existing narrowband speech-based network service equipment can thereby be accessed by wideband terminals without a significant reduction of subjective speech quality. Corresponding to the second situation, for the case that the service equipment is employed during a connection exclusively or in addition as receiving unit, the network element should further include means for converting wideband audio signals into narrowband audio signals. The transcoding in either direction is again preferably carried out close to the wideband terminal in order to avoid the necessity of transmitting wideband signal on the entire transmission path.

In the fourth situation audio signals are to be transmitted between two wideband terminals, where it is preferred to transmit the audio signals at least in a part of the interconnecting network or networks as narrowband signal. By combining bandwidth reduction, e.g. low-pass filtering, and artificial bandwidth expansion in a network element of each of the wireless communications networks to which the respective wideband terminal is connected, a wideband audio signal can be converted into a narrowband audio signal at the beginning of the transmission path and converted back into a wideband audio signal at the end of the transmission path. Thus, the operator is able to transmit wideband speech with little transmission capacity, in particular also using existing trunking networks, without a significant reduction of the speech quality perceived by the users of the wideband terminals.

The network element of the invention can be any network element which has access to traffic channels of a circuit switched network or which has access to the user plane of a packet network. If it is a network element of a wireless communications network, it can be for instance a network element of a GSM BSS (Base Station Subsystem), of a RAN (Radio Access Network), or of a core network. The network element should moreover have enough signal processing capacity to carry out the transcoding according to the invention. Therefore, the network element according to the invention can be in particular, though not exclusively, a transcoder unit of 2G networks, a transcoder unit of 3G networks, a media gateway enabling the inter-working of user data between packet and circuit switched networks, a multi resource function in all-IP (Internet Protocol) networks, an announcement device in any network, an interactive voice interface device, or a streaming server in packet networks.

BRIEF DESCRIPTION OF THE FIGURES

In the following, the invention is explained in more detail with reference to drawings, of which

DETAILED DESCRIPTION OF THE INVENTION

Figure 1:
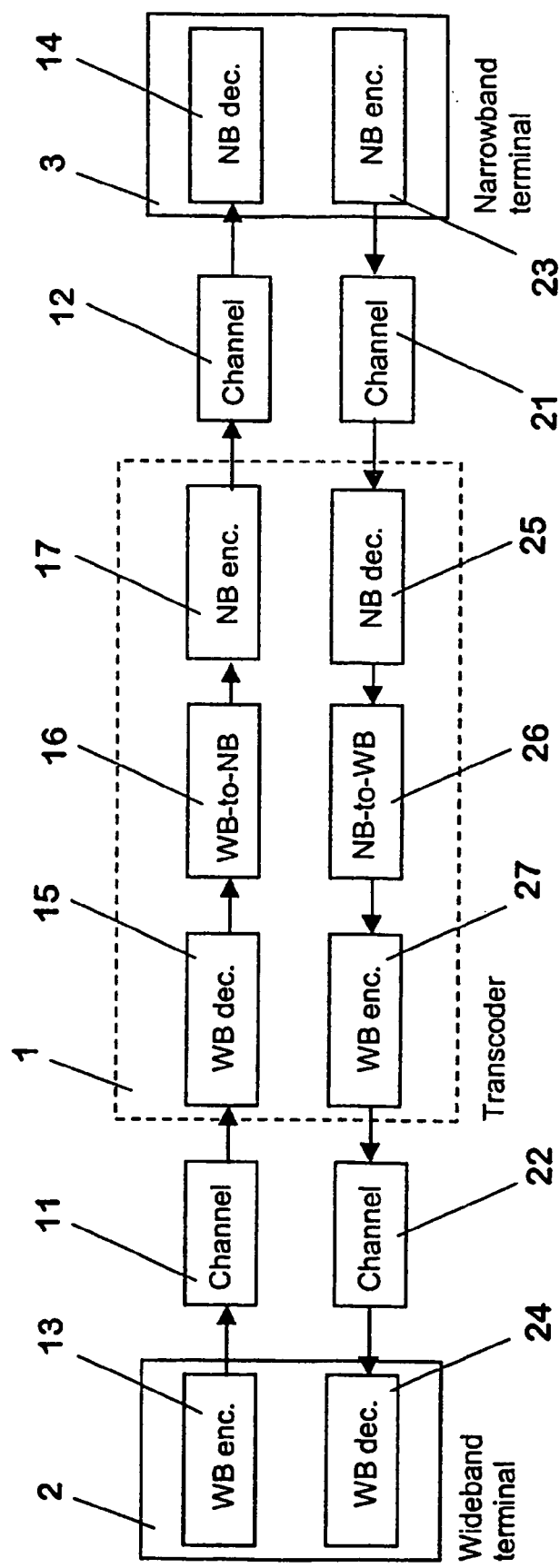
FIG. 1 is a high-level block diagram of an embodiment of the communications system of the invention.

FIG. 1 schematically shows selected elements of an embodiment of the communications system according to the invention.

In the system, a communications network comprises in one of its network elements a transcoder 1. Of the network, which can either be a circuit switched or a packet switched network, only the transcoder 1 is depicted. The system further comprises a wideband terminal 2 and a narrowband terminal 3. The network element with the transcoder 1 has access to traffic channels 11, 12, 21, 22 established respectively between the terminals 2, 3 and the network for uplink and downlink transmissions.

The wideband terminal 2 includes a wideband encoder 13 and a wideband decoder 24. The narrowband terminal 3 includes correspondingly a narrowband encoder 23 and a narrowband decoder 14. The transcoder 1 includes on the one hand a wideband decoder 15 connected via a wideband-to-narrowband converter 16 to a narrowband encoder 17. On the other hand, the transcoder 1 includes a narrowband decoder 25 connected via a narrowband-to-wideband converter 26 to a wideband encoder 27.

The depicted part of the communications system functions as follows:

In a first situation, speech is to be transmitted from the wideband terminal 2 to the narrowband terminal 3. The wideband terminal 2 encodes the speech in the integrated wideband encoder 13 in order to obtain an encoded wideband signal. The encoded signal is then transmitted to the transcoder 1 via the physical channel 11 established for uplink transmissions between the wideband terminal 2 and the network.

In the transcoder 1, the received wideband signal is first decoded by the wideband decoder 15 in order to obtain a linear wideband signal. The linear wideband signal is subsequently converted by the wideband-to-narrowband converter 16 to a linear narrowband signal. As a last step performed in the transcoder 1, the narrowband encoder 17 encodes the obtained linear narrowband signal.

The encoded narrowband signal is transmitted by the network to the narrowband terminal 3 via a downlink channel 12 established between the network and the narrowband terminal 3. The narrowband terminal 3 now decodes the received narrowband signal with its narrowband decoder 14 for presentation to a user.

In a second situation, speech is to be transmitted in the opposite direction, i.e. from the narrowband terminal 3 to the wideband terminal 2. In this case, the narrowband terminal 3 encodes the speech that is to be transmitted with the integrated narrowband encoder 23. The resulting signal is transmitted to the network element with the transcoder 1 via the uplink channel 21 established between the narrowband encoder 23 and the network.

In the network element, the narrowband decoder 25 of the transcoder 1 decodes the received signal to a linear narrowband signal. Further, the narrowband-to-wideband converter 26 of the transcoder 1 converts the linear narrowband signal to a linear wideband signal. The conversion includes a generation of an artificial linear wideband signal out of the linear narrowband signal. The linear wideband signal is encoded again by the wideband encoder 27 of the transcoder 1 and forwarded to the wideband terminal 2 via downlink channel 22 established between the network and the wideband terminal 2.

In the wideband terminal 2, the wideband decoder 24 decodes the received signals to linear wideband signals for presenting them to a user.

Thus, the depicted system enables bi-directional transmissions of speech signals between the wideband terminal 2 and the narrowband terminal 3.

Selected possibilities of generating artificial wideband signals during a narrowband-to-linear conversion will now be described with reference to FIGS. 2 and 3.

Figure 2:
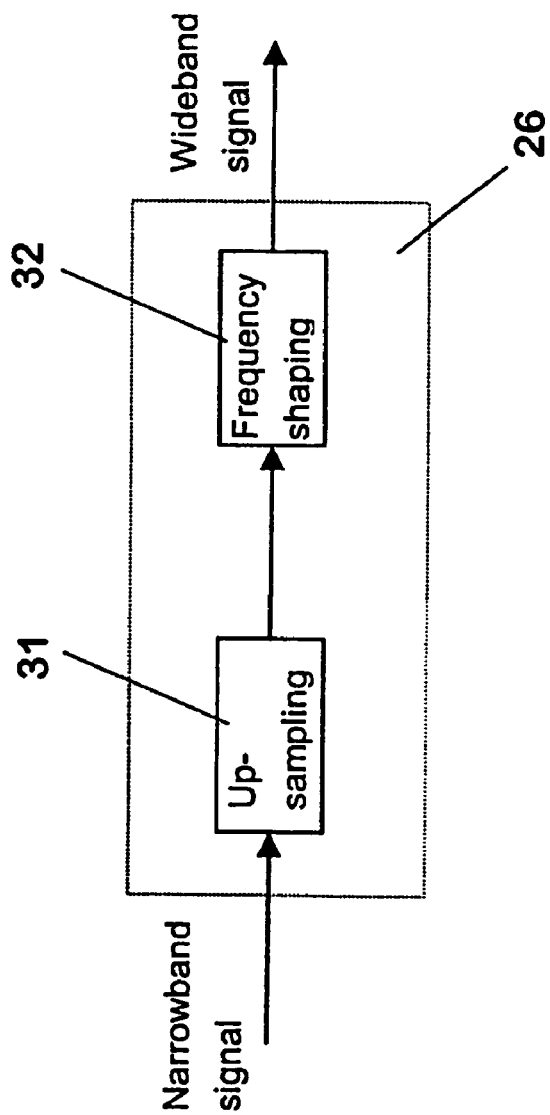
FIG. 2 is a block diagram illustrating a first embodiment of a narrowband-to-wideband conversion according to the invention.

FIG. 2 is a schematic block diagram of a first embodiment of the narrowband-to-wideband converter 26 of FIG. 1. The converter 26 of this embodiment comprises means for up-sampling 31 and means for frequency shaping 32.

In the first embodiment, the linear narrowband signal is up-sampled without low-pass filtering by the means for up-sampling 31. This generates alias frequency components of the narrowband signal onto the upper band of the wideband signal, i.e. a mirror image of the narrowband signal in the frequency domain. This aliased wideband signal, however, contains excessive distortion which would be subjectively annoying for the user of the receiving wideband terminal 2. Therefore the distortions are smoothed in the means for frequency shaping 32 by attenuating dynamically aliased components based on the narrowband signals. It is to be noted that in particular more attenuation is needed for aliased components with voiced phonemes than for those with unvoiced phonemes.

Figure 3:
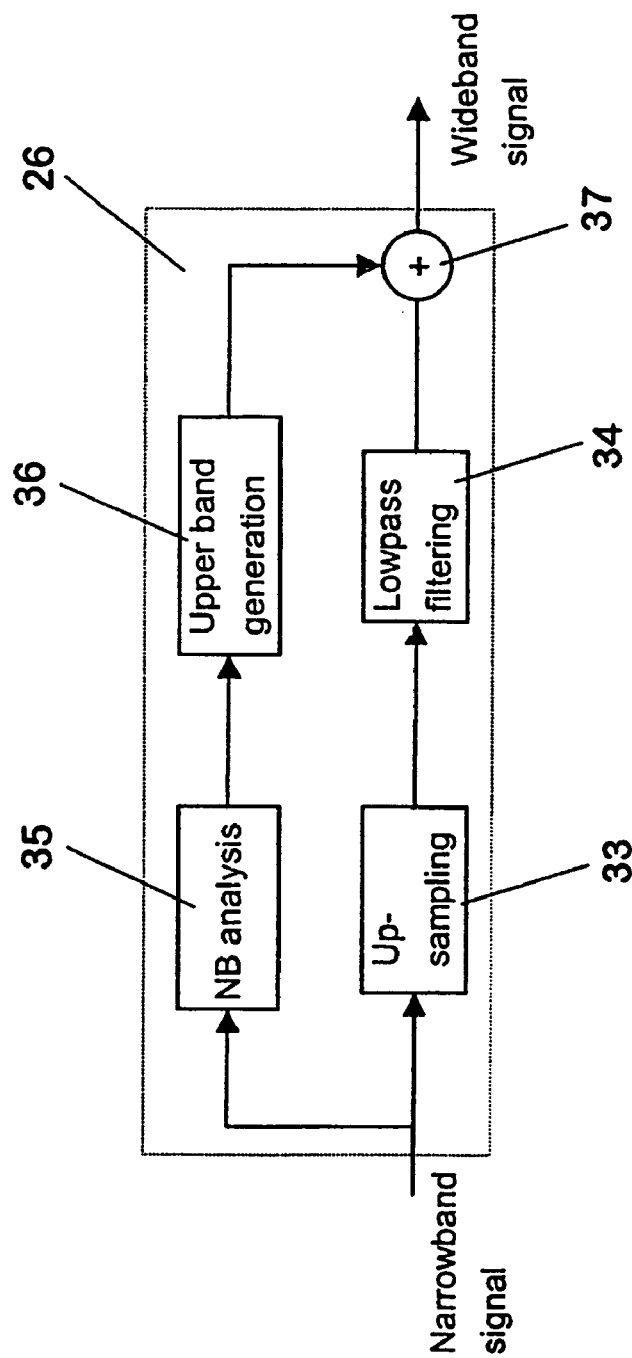
FIG. 3 is a block diagram illustrating a second embodiment of a narrowband-to-wideband conversion according to the invention.

Another possibility of converting linear narrowband signals to linear wideband signals is presented in FIG. 3, which illustrates, in form of a schematic block diagram, a second embodiment of the narrowband-to-wideband converter 26 of FIG. 1.

The second embodiment of the narrowband-to-wideband converter 26 comprises a first processing branch with means 33, 34 for up-sampling and lowpass filtering received signals. A second processing branch includes means for a narrowband analysis 35 and means for an upper band signal generation 36. The output of both processing branches is connected to summing means 37, which form the output of the narrowband-to-wideband converter 26 of FIG. 1.

In the first processing branch of the converter 26, the linear narrowband signal is first up-sampled and then low-pass filtered by the corresponding means 33, 34 in order to obtain a distortion free linear wideband signal of a lower frequency band.

In the second processing branch of the converter 26, the upper frequency band of the wideband signal is statistically recovered by using the spectral characteristics of the frequency components of the received narrowband signal.

The means for a narrowband analysis 35 in the second processing branch first perform a spectrum analysis of the received narrowband signal. The means for upper band signal generation 36 have access to a stored codebook of narrowband speech spectral parameters and to a corresponding stored codebook of upper band wideband speech spectral parameters. The means for upper band signal generation 36 are therefore able to perform a mapping between narrowband and wideband codebook values, wherein the required narrowband codebook values are calculated from the spectrum analysis of narrowband signal. The mapping is thus suited for predicting the upper band spectrum of wideband speech based on the received narrowband signal. The upper band signal is generated more specifically by shaping upper band excitation signal with a spectrum-shaping filter which is defined by the determined wideband codebook values. The upper band excitation signal can be a locally generated noise or pulse excitation, like in a linear prediction coding (LPC) based speech codec. Alternatively, the upper band excitation signal could be a mirror image of the narrow band signal, like in the first embodiment, or a frequency shaped mirror image.

In order to obtain finally the complete wideband signal, the artificially generated upper band signal output by the second processing branch is added by the means for summing 37 to the lower band signal output by the first processing branch.

The wideband-to-narrowband conversion in the wideband-to-narrowband converter 16 of FIG. 1 can be realized for example by lowpass filtering the linear wideband signal and by then down-sampling the low-pass filtered wideband signal. The result is an alias distortion free narrowband signal.

In both directions, the transcoding can equally be achieved with other suitable methods, as long as the transcoding of a narrowband signal to a wideband signal results in an at least partially artificial wideband signal of a broader frequency range than the original narrowband signal.

Figure 4:
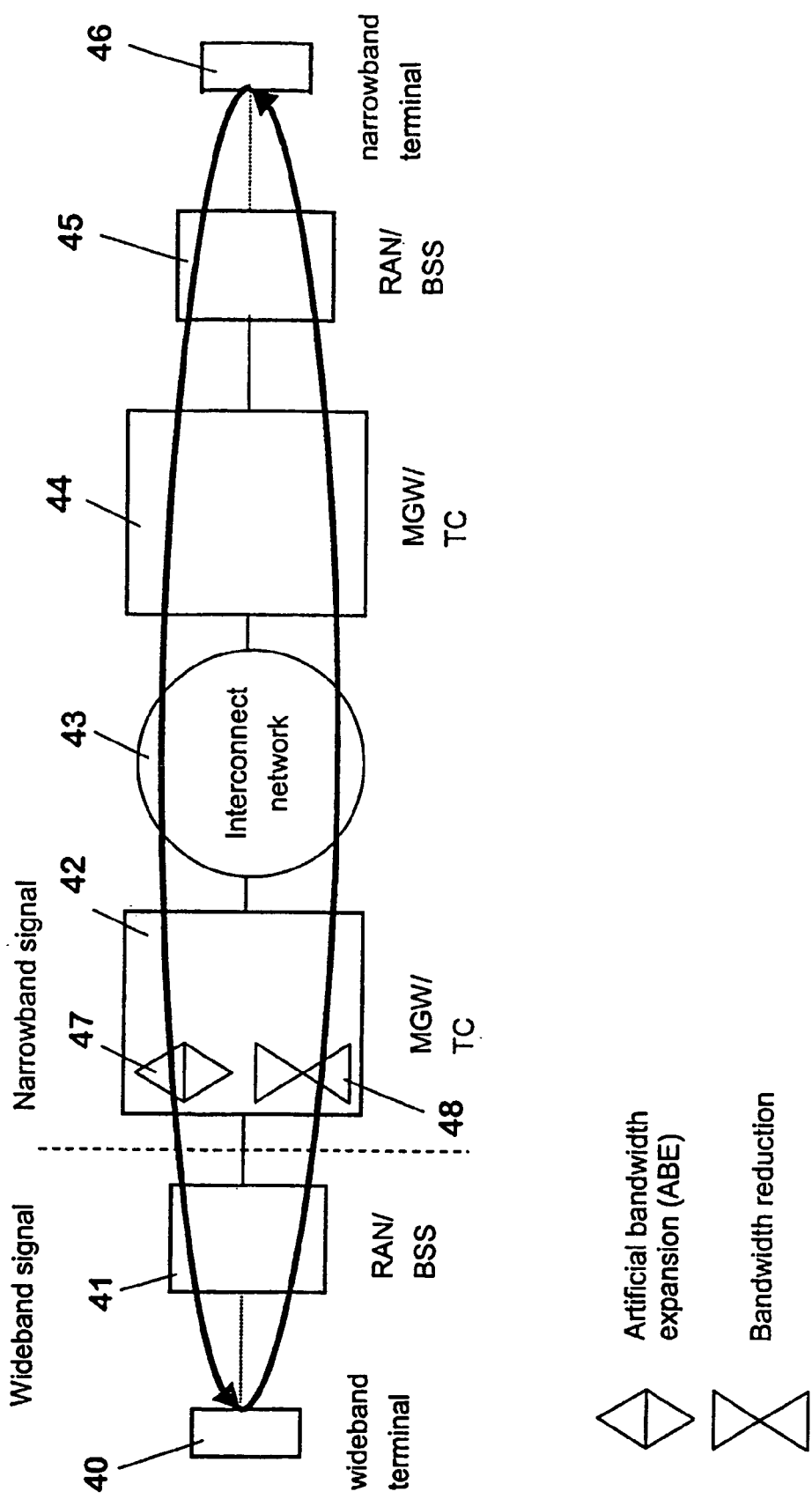
FIG. 4 illustrates a schematic diagram of a communications system according to an exemplary embodiment of the present invention.
Figure 5:
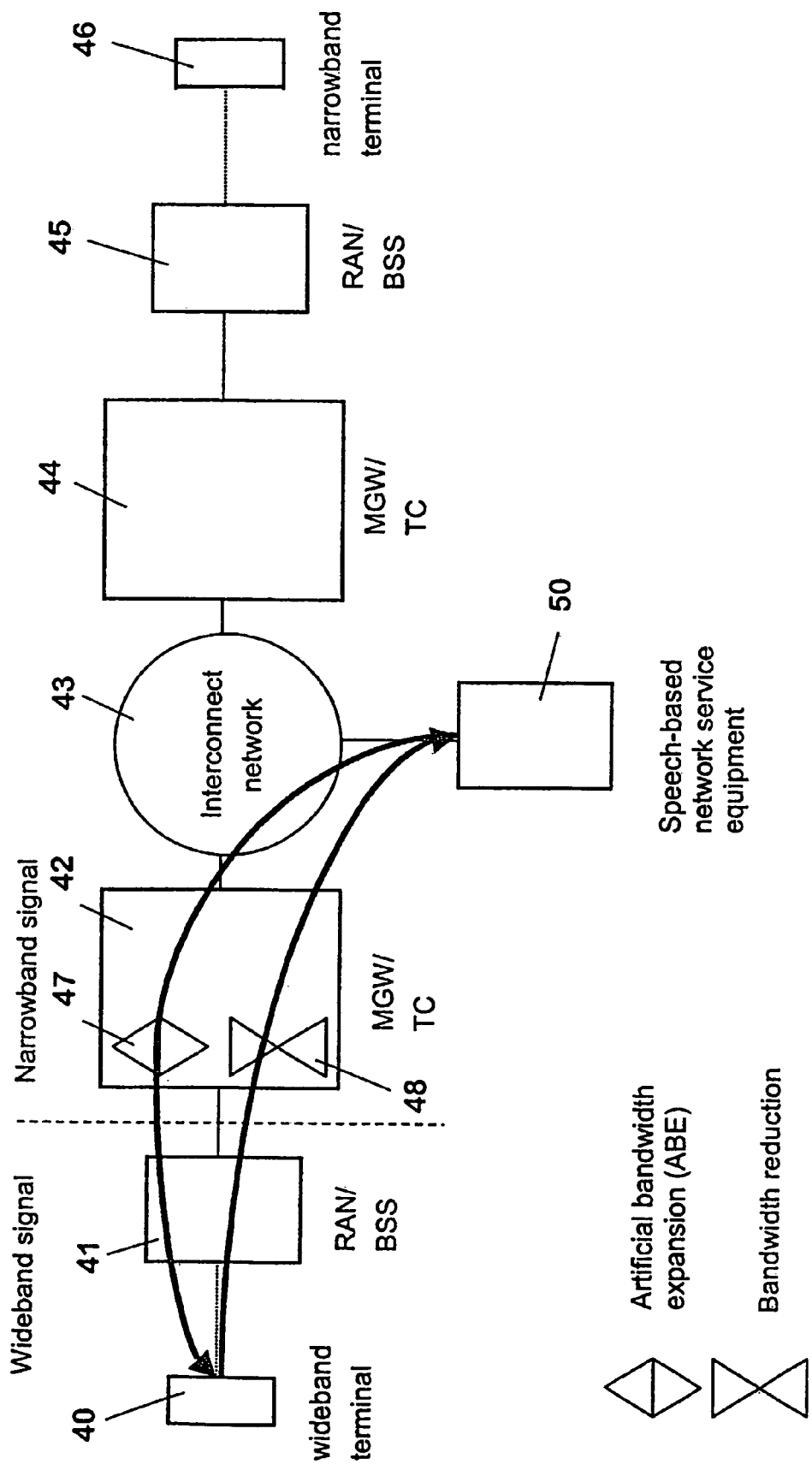
FIG. 5 illustrates a schematic diagram of a communications system according to another exemplary embodiment of the present invention.
Figure 6:
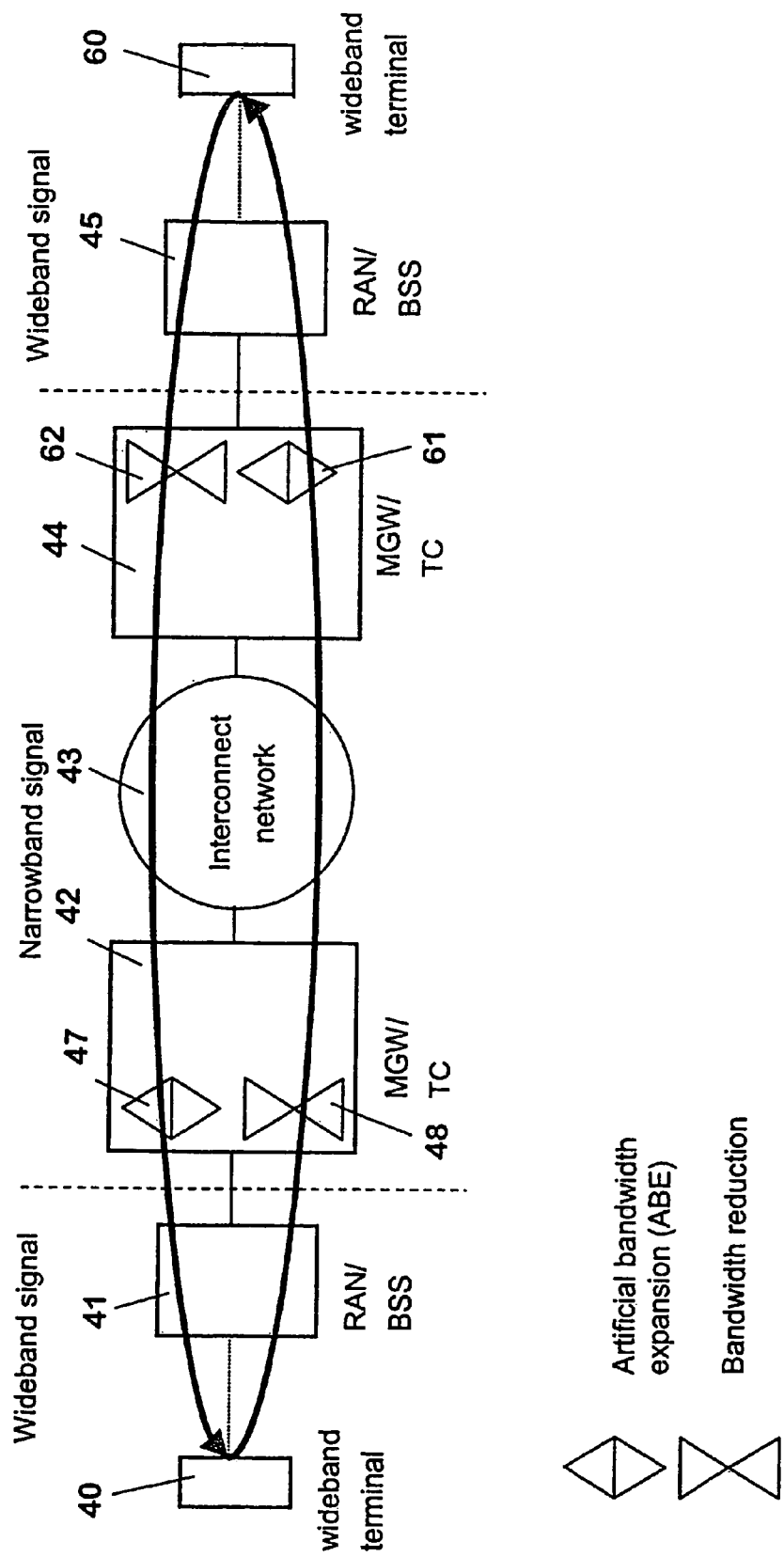
FIG. 6 illustrates a schematic diagram of the communications system according to another exemplary embodiment of the present invention.

With reference to FIGS. 4, 5 and 6, three different situations will now be presented, in which the invention can be employed advantageously. Corresponding elements are referred to in these figures by the same reference signs.

FIG. 4 is a schematic block diagram of a communications system and illustrates a first situation in which audio signals are to be transmitted between a wideband terminal and a narrowband terminal. The system basically corresponds to the system of FIG. 1, only the network part being depicted in more detail. In FIG. 4, a wideband terminal 0.40 has access to a first UTRAN-RAN (radio access network) or a GSM-BSS (base station system) 41. The first RAN or BSS 41 is connected via a first core network with a first network element 42, via an interconnect network 43 and via a second core network with a second network element 44 to a second RAN or BSS 45. A narrowband terminal 46 has access to the second RAN or BSS 45. The depicted network elements 42, 44 are both either a 3G media gateway MGW or a 2G transcoder TC, which are employed in core networks for performing the transcoding between different speech coding schemes. The first network element 42 comprises means 47 for artificial bandwidth expansion of received narrowband audio signals, and means 48 for bandwidth reduction of received wideband audio signals. Transmissions between the wideband terminal 40 and the narrowband terminal 46 are indicated in the figure by arrows.

A wideband audio signal transmitted by the wideband terminal 40 and addressed to the narrowband terminal 46 of FIG. 4 is received by the first RAN or BSS 41 and forwarded to the depicted network element 42 of the connected core network. In the network element 42, the wideband audio signal is subject to a bandwidth reduction in order to obtain a narrowband audio signal. The bandwidth reduction is achieved by the means 48 for bandwidth reduction, for example as mentioned above by employing a lowpass filtering. The narrowband audio signal is then transmitted via the interconnect network 43, the second network element 44 of the second core network and the second RAN or BSS 45 to the narrowband terminal 46. The narrowband terminal 46 is able to present the received narrowband audio signal to a user.

In the opposite direction, a narrowband audio signal transmitted by the narrowband terminal 46 and addressed to the wideband terminal 40 of FIG. 4 is received by the second RAN or BSS 45 and forwarded to the depicted network element 44 of the connected core network. The narrowband audio signal is then further transmitted via the interconnect network 43, to the network element 42 of the first core network. In this network element 42, an artificial wideband audio signal is generated by the means for bandwidth extension 47 out of the received narrowband audio signal, e.g. according to one of the methods described with reference to FIGS. 1 to 3. The generated wideband audio signal is then forwarded via the first RAN or BSS 41 to the wideband terminal 40. The wideband terminal 40 is able to present the received audio signal to a user without subjective reduction of speech quality compared to received original wideband speech.

FIG. 5 illustrates a second situation in which audio signals are to be transmitted between terminals and a speech-based network service equipment. The figure shows a communications system which corresponds to the system of FIG. 4, except that both terminals 40, 46 have in addition access to a speech-based network service equipment 50 via the respective RAN or BSS 41, 45, the respective core network with network element 42 or 44 and the interconnect network 43. The speech-based network service equipment 50 only stores narrowband speech samples and is only designed for handling narrowband audio signals.

Transmissions between the speech-based network service equipment 50 and the narrowband terminal 46 are carried out in either direction via the interconnect network 43, the second network element 44 of the second core network and the second RAN or BSS 45 without a transcoding according to the invention.

Transmissions between the speech-based network service equipment 50 and the wideband terminal 40 are indicated in the figure by arrows. They are carried out via the interconnect network 43, the first network element 42 of the first core network and the first RAN or BSS 41, or in reversed order respectively. In this case, however, wideband audio signals originating from the wideband terminal 40 are reduced in bandwidth by the corresponding means 48 of the first network element 42 to form a narrowband audio signal, and narrowband audio signals originating from the speech-based network service equipment 50 are expanded to artificial wideband audio signals by the corresponding means 47 of the first network element. The processing is thus analogous to the processing in the situation of FIG. 4.

It depends on the respective application whether a bandwidth reduction, an artificial bandwidth expansion or both are required in the network element 42 of the first core network.

In the situation of FIG. 5, instead of a speech-based network service equipment 50, also a PSTN narrowband terminal could be connected to the interconnect network 43. In order to enable a communication according to the invention between such a PSTN narrowband terminal and the depicted wideband terminal 40, a processing corresponding to the processing described with reference to FIG. 5 for the communication involving a speech-based network service equipment 50 can be employed.

In a last presented situation, signals are to be transmitted between two wideband terminals. FIG. 6 therefore shows a communications system which corresponds again largely to the system of FIG. 4, except that in this communications system, both terminals 40, 60 are wideband terminals. The first wideband terminal 40 is connected to the first RAN or BSS 41 as in FIG. 4, and the second wideband terminal 60 is connected to the second RAN or BSS 45 as the narrowband terminal in FIG. 4. The interconnect network 43 of the system of FIG. 6 is moreover supposed to be a trunking network which was exclusively designed for transmitting narrowband signals. In the system of FIG. 6, also the second network element 44 comprises means 61 for artificial bandwidth expansion of received narrowband audio signals, and means 62 for bandwidth reduction of received wideband audio signals.

In the system of FIG. 6, it is not different kinds of units employed for transmitting and receiving audio signals which make a transcoding necessary, since both involved units 40, 60 are wideband terminals. Rather, a transcoding is employed for enabling a low capacity transmission via the trunking network 43.

Thus, whenever the first wideband terminal 40 transmits a wideband audio signal addressed to the second wideband terminal 60, the audio signal is forwarded via the first RAN or BSS 41 to the first network element 42, where it is processed a first time. More specifically, the means 48 for bandwidth reduction of the first network element 42 are employed for generating based on the received wideband audio signal a narrowband audio signal, which can be transmitted by the employed interconnect network 43. The interconnect network 43 forwards the narrowband audio signal to the second network element 44 of the second core network. The means 61 for artificial bandwidth expansion of the second network element 44 convert the received narrowband audio signal artificially into a wideband audio signal again. The wideband audio signal is forwarded via the second RAN or BSS 45 to the second wideband terminal 60. For bandwidth reduction and expansion, for example the methods described with reference to FIGS. 1 to 3 can be employed, just as for the situations illustrated in FIGS. 4 and 5. By this proceeding, the second wideband terminal 60 can be supplied with wideband speech via the trunking network 43 without a significant reduction of subjective speech quality.

In the opposite direction, the processing is exactly the same, a bandwidth reduction of a transmitted wideband audio signal being carried out by the corresponding means 62 of the second network element 44, and a generation of an artificial wideband audio signal by the corresponding means 47 of the first network element 42.

The methods for artificial bandwidth generation employed in the above described embodiments of the inven-

The invention claimed is:

1. A method comprising:
   receiving an audio signal in a network element of a communications network;
   determining in said network element based at least on the kind of the received signal and on the capabilities of said receiving unit whether a transcoding of the received audio signal is required;
   converting a received encoded narrowband audio signal into an encoded wideband audio signal in said network element, and forwarding the generated encoded wideband audio signal to a receiving unit, in case said received audio signal is an encoded narrowband audio signal and in case it was determined that a narrowband-to-wideband transcoding of the received signal is required.

2. The method according to claim 1, wherein said network determines whether a transcoding of the received audio signal is required based on the capabilities of an interconnect network interconnecting said network element with said receiving unit.

3. The method according to claim 1, wherein said receiving unit is a wideband terminal, a narrowband terminal or a speech-based network service equipment.

4. The method according to claim 1, wherein a received narrowband audio signal is converted into a wideband audio signal in said network element by generating an at least partially artificial wideband audio signal based on the received narrowband audio signal.

5. The method according to claim 1, wherein said received audio signal is an encoded audio signal, wherein a received narrowband audio signal is decoded before being converted to a wideband audio signal, and wherein a generated wideband audio signal is encoded before being forwarded to the receiving unit.

6. The method according to claim 1, wherein converting a received narrowband signal comprises up-sampling the received narrowband audio signal and frequency shaping the up-sampled signal in a way suited to smooth distortions resulting in the up-sampling.

7. The method according to claim 1, wherein converting a received narrowband audio signal comprises
   up-sampling the received narrowband audio signal and lowpass filtering the up-sampled signal in order to obtain a lower band signal;
   generating an artificial upper band signal based on a statistical evaluation of the received narrowband audio signal; and
   combining the obtained lower band signal with the generated upper band signal to a wideband audio signal.

8. The method according to claim 7, wherein the artificial upper band signal is generated by performing a spectral analysis of a received narrowband audio signal and by mapping resulting narrowband codebook values to wideband codebook values, the wideband codebook values forming a spectrum-shaping filter used for shaping upper band excitation signal.

9. The method according to claim 1, wherein said received audio signal is an encoded audio signal, and wherein a received narrowband audio signal is converted without decoding to a coded wideband audio signal in the speech parameter domain.

10. The method according to claim 1, further comprising in case said received audio signal is a wideband audio signal and in case it was determined that a wideband-to-narrowband transcoding of the received signal is required, converting said received wideband audio signal into a narrowband audio signal, and transmitting the generated narrowband audio signal to the receiving unit.

11. The method according to claim 10, wherein said received audio signal is an encoded audio signal, wherein a received wideband audio signal is decoded before being converted to a narrowband audio signal, and wherein a generated narrowband audio signal is encoded before being forwarded to the receiving unit.

12. The method according to claim 10, wherein said received audio signal is an encoded audio signal, and wherein a received wideband audio signal is converted without decoding to a coded narrowband audio signal in the speech parameter domain.

13. The method according to claim 1, wherein said network element is a network element of a wireless communications network.

14. The method according to claim 1, wherein a receiving unit is capable of handling wideband audio signals, wherein a narrowband audio signal is transmitted by a public switched telephone network terminal capable of handling narrowband audio signals and addressed to said receiving unit, wherein said narrowband audio signal is transmitted via said communications network to said receiving unit, and wherein said narrowband audio signal is converted in a network element of said communications network to an at least partially artificial wideband audio signal before transmission to said receiving unit.

15. The method according to claim 1, wherein a receiving unit is capable of handling wideband audio signals, wherein said communications network comprises a wireless communications network to which said receiving unit is connected, wherein a narrowband audio signal is transmitted by a unit capable of handling narrowband audio signals and addressed to said receiving unit, wherein said narrowband audio signal is transmitted via said wireless communications network to said receiving unit, and wherein said narrowband audio signal is converted in a network element of said wireless communications network to an at least partially artificial wideband audio signal for transmission to said receiving unit.

16. The method according to claim 1, wherein a receiving unit is capable of handling narrowband audio signals, wherein a wideband audio signal is transmitted by a transmitting unit capable of handling wideband audio signals and addressed to said receiving unit, wherein said communications network comprises a wireless communications network to which said transmitting unit is connected, wherein said wideband audio signal is to be transmitted via said wireless communications network to said receiving unit, and wherein said wideband audio signal is converted in a network element of said wireless communications network to a narrowband audio signal for transmission to said receiving unit.

17. The method according to claim 1, wherein a receiving unit is capable of handling wideband audio signals, wherein said communications network comprises a first wireless communications network to which said receiving unit is connected, wherein a wideband audio signal is transmitted by a transmitting unit capable of handling wideband audio signals and addressed to said receiving unit, wherein said communications network comprises a further wireless communications network to which said transmitting unit is connected, wherein said first and said further wireless communications network are interconnected by an interconnect network capable of transmitting narrowband audio signals, wherein said wideband audio signal transmitted by said transmitting unit is converted in a network element of said further wireless communications network into a narrowband audio signal for transmission to said first wireless communications network via said interconnect network, and wherein said narrowband signal is converted in a network element of said first wireless communications network to an at least partially artificial wideband audio signal for transmission to said receiving unit.

18. A network element, comprising:
   means for receiving audio signals addressed at a receiving unit;
   processing means for determining whether a transcoding of the received audio signal is required based at least on the kind of the received audio signal and on the capabilities of the receiving unit;
   transcoder for transcoding a received audio signal, said transcoder comprising means for converting a received encoded narrowband audio signal into an encoded wideband audio signal, in case said transcoder receives an indication from within said network element that a narrowband-to-wideband transcoding of a received signal is required; and
   means for forwarding audio signals to a receiving unit.

19. The network element according to claim 18, wherein said processing means determine whether a transcoding of the received audio signal is required based on the capabilities of an interconnect network interconnecting said network element and said receiving unit.

20. The network element according to claim 18, wherein said means of said transcoder for converting a received narrowband audio signal into a wideband audio signal are means for converting said received narrowband audio signal into a wideband audio signal by generating an at least partially artificial wideband audio signal based on the received narrowband audio signal.

21. The network element according to claim 18, wherein said transcoder further comprises decoding means for decoding a received narrowband audio signal before it is converted by the means for converting, and encoding means for encoding a generated wideband audio signal to an encoded wideband audio signal.

22. The network element according to claim 18, wherein said means for converting of said transcoder comprise means for up-sampling a received narrowband audio signal and means for frequency shaping said up-sampled signal in a way suited to smooth distortions resulting in the up-sampling.

23. The network element according to claim 18, wherein said means of said transcoder for converting comprises
   means for up-sampling a received narrowband audio signal and for lowpass filtering the up-sampled signal in order to obtain a lower band signal;
   means for generating an artificial upper band signal based on a statistical evaluation of the received narrowband audio signal; and
   means for combining the obtained lower band signal with the generated upper band signal to a wideband audio signal.

24. The network element according to claim 23, wherein said means of said transcoder for generating an artificial upper band signal comprise a spectral analyzer for analyzing a received narrowband signal, and means for spectrum-shaping the analyzed signals with a filter for shaping upper band excitation, wherein said filter is created by mapping narrowband codebook values obtained based on the spectral analysis to wideband codebook values.

25. The network element according to claim 18, wherein said means of said transcoder for converting a received narrowband audio signal into a wideband audio signal are means for converting a received encoded narrowband signal into an encoded wideband signal in the parameter domain.

26. The network element according to claim 18, wherein said transcoder further comprises means for converting a received wideband audio signal into a narrowband audio signal in case said transcoder receives information from within said network element that a wideband-to-narrowband transcoding of a received signal is required.

27. The network element according to claim 26, wherein said transcoder further comprises decoding means for decoding a received wideband audio signal before it is converted by the means for converting, and encoding means for encoding a generated narrowband audio signal to an encoded narrowband audio signal.

28. The network element according to claim 26, wherein said means of said transcoder for converting a received wideband audio signal into a narrowband audio signal are designed for converting a received encoded wideband signal into an encoded narrowband signal in the parameter domain.

29. A wireless communications network comprising a network element according to claim 18.

30. A communications system comprising a first unit capable of handling narrowband audio signals, a second unit capable of handling wideband audio signals, and a communications network with a network element according to claim 18, said first unit being interconnectable with said second unit via said communications network.

31. The communications system according to claim 30, wherein said first unit capable of handling narrowband audio signals is a public switched telephone network terminal capable of handling narrowband audio signals.

32. The communications system according to claim 30, wherein said first unit capable of handling narrowband audio signals is a narrowband terminal accessing a first wireless communications network, wherein said second unit capable of handling wideband audio signals is a wideband terminal accessing a second wireless communications network, wherein said first unit is interconnected with said second unit via said first wireless communications network, an interconnect network and said second wireless communications network, and wherein said network element is part of said second wireless communications network.

33. The communications system according to claim 30, wherein said first unit capable of handling narrowband audio signals is a narrowband speech-based network service equipment connected to an interconnect network, wherein said second unit capable of handling wideband audio signals is a wideband terminal accessing a wireless communications network, wherein said first unit is interconnected with said second unit via said interconnect network and said wireless communications network, and wherein said network element is part of said wireless communications network.

34. The communications system comprising a first unit capable of transmitting wideband audio signals, a second unit capable of receiving and handling wideband audio signals, and a communications network comprising at least a first wireless communications network, an interconnect network capable of handling narrowband audio signals, and a second wireless communications network, wherein said first unit is interconnectable with said second unit via said first wireless communications network, said interconnect network, and said second wireless communications network, each wireless communications network comprising a network element according to claim 18.

* * * * *